(12) United States Patent
Leponce et al.

(10) Patent No.: US 8,511,754 B2
(45) Date of Patent: Aug. 20, 2013

(54) UPHOLSTERED SEAT ELEMENT

(75) Inventors: Fabian Leponce, Martelange (BE); Jean Claude Schmitz, Olm (LU); Sanel Imamovic, Differdange (LU)

(73) Assignee: IEE International Electronics & Engineering S.A., Luxembourg (LU)

( * ) Notice: Subject to any disclaimer, the term of this patent is extended or adjusted under 35 U.S.C. 154(b) by 631 days.

(21) Appl. No.: 12/600,855

(22) PCT Filed: May 28, 2008

(86) PCT No.: PCT/EP2008/056546
§ 371 (c)(1),
(2), (4) Date: May 12, 2010

(87) PCT Pub. No.: WO2008/145671
PCT Pub. Date: Dec. 4, 2008

(65) Prior Publication Data
US 2010/0244540 A1    Sep. 30, 2010

(30) Foreign Application Priority Data

May 29, 2007 (EP) .................... 07109142

(51) Int. Cl.
A47C 7/74      (2006.01)
A47C 31/00    (2006.01)
A47C 27/00    (2006.01)

(52) U.S. Cl.
USPC ............. 297/452.38; 297/180.12; 297/218.2; 297/452.6

(58) Field of Classification Search
USPC .................. 297/218.1, 218.2, 218.3, 452.38, 297/452.56, 452.58, 452.59, 452.6, 180.12
See application file for complete search history.

(56) References Cited

U.S. PATENT DOCUMENTS 4,695,091 A  *  9/1987  Altmann et al. ......... 297/180.12
4,865,383 A     9/1989  Sbaragli et al.
(Continued)

FOREIGN PATENT DOCUMENTS
EP        1356983       10/2003

OTHER PUBLICATIONS
International Search Report; PCT/EP2008/056546; Jan. 19, 2009.

*Primary Examiner* — David Dunn
*Assistant Examiner* — Tania Abraham
(74) *Attorney, Agent, or Firm* — Cantor Colburn LLP

(57) ABSTRACT

An upholstered seat element for a vehicle seat comprises a foam padding (10) having a surface generally shaped in conformity with an outward surface of the vehicle seat, a trim cover disposed on the foam padding surface, a sheet-type electric device arranged between the foam padding and the trim cover and an attachment assembly securing the trim cover to the foam padding. The foam padding has at least one channel formed therein on the foam padding surface, along which channel the attachment assembly is arranged. The sheet-type device has at least one strip-shaped portion crossing the channel in at least one crossing location. The foam padding has a recess formed therein at the at least one crossing location, the recess being dimensioned in such a way that the strip-shaped portion of the film type device may slide into the recess when the upholstered seat element is subjected to a force inducing deformation of the foam padding. The recess is arranged offset from the middle of the crossing location, on the course of the strip-shaped portion of the sheet-like electric device (18) and a further recess is formed in the foam at the at least one crossing location, the further recess being arranged substantially symmetrically to the first recess with respect to the middle of the crossing location, on the course of the strip-shaped portion.

14 Claims, 5 Drawing Sheets

(56) References Cited

U.S. PATENT DOCUMENTS

| | | | |
|---|---|---|---|
| 4,952,776 A * | 8/1990 | Huguet | 219/217 |
| 5,993,955 A * | 11/1999 | Mense | 428/317.9 |
| 6,817,675 B2 | 11/2004 | Buss et al. | |
| 7,942,477 B1 * | 5/2011 | Toba et al. | 297/180.12 |
| 8,118,362 B2 * | 2/2012 | Nishimura et al. | 297/217.3 |
| 2002/0002854 A1 * | 1/2002 | Imoto et al. | 73/1.13 |
| 2002/0093236 A1 * | 7/2002 | Inoue | 297/452.48 |
| 2005/0006944 A1 * | 1/2005 | Ali et al. | 297/452.6 |
| 2008/0111403 A1 * | 5/2008 | Ulbrich et al. | 297/180.12 |
| 2009/0146470 A1 * | 6/2009 | Thompson et al. | 297/180.12 |

\* cited by examiner

Technical Background

Technical Background

Technical Background

UPHOLSTERED SEAT ELEMENT

TECHNICAL FIELD

The present invention generally relates to an upholstered seat element of a vehicle seat, in particular to such an upholstered seat element equipped with a sheet-like electric device crossing a crimp channel of the upholstered seat element.

BACKGROUND ART

A vehicle seat includes, in general, upholstered seat elements (seating portion and backrest) and a frame supporting the seat elements and mounting them to the vehicle. An upholstered seat element comprises a padding and trim material (e.g. textile, genuine or artificial leather, and the like) covering the padding and providing a durable outer surface for contact with a seat occupant. Typically, the padding is made from an expandable foam material, such as a polymer (e.g. polyurethane), and moulded to a predetermined shape during a moulding process. The trim cover is attached to the padding or the frame or both through an attachment assembly.

Such attachment assemblies exist in numerous variants. Generally, they comprise anchor components secured to the padding or the underlying seat frame, which the trim cover is fastened to, e.g. by means of hook elements, clamps, straps, or like fastening elements. Examples of attachment assemblies can be found, for instance, in US patent application 2005/0006944 A1, U.S. Pat. No. 6,817,675 and U.S. Pat. No. 4,865,383.

The areas of a vehicle seat wherein the attachment assemblies are located may be visible or hidden to the seat occupant, the visible variant being the more common one. The attachment areas (hereinafter referred to as "crimp channels") may be recognisable, in the visible variant, as seam lines or grooves, defining and separating more loosely padded portions of the upholstered seat element. In the visible variant, the crimp channels contribute to a large extend to the outer appearance of the seat surface.

It is known that vehicle seats are increasingly equipped with various kinds of sensors and electronic devices, such as occupancy sensors, seat belt buckle sensors, seat heaters, etc. Integration of such devices into the seat is a complex process, in particular because of design constraints based upon haptic or aesthetic criteria. The course of the crimp channels represents a serious constraint for sensors and electronic devices, in particular if these are to be located close to or in the trim cover.

At crossings of a sheet-type electric device (such as e.g. film-type pressure sensors, film-type capacitive sensors, textile sensors, etc.) with a crimp channel, a deformation of the padding may cause buckling of the sheet type electric device. A conventional configuration of such a crossing is illustrated in FIGS. 1a-1c. The foam padding 10 has a channel 12 formed therein, which runs on the surface of the foam padding 10. A trim cover (not shown) is disposed on this surface of the padding and is secured thereto by an attachment assembly 14, 16 extending along the channel 12. It should be noted that the trim cover follows the contour of the padding surface and is drawn into the channel 12 by the attachment assembly 14, 16. A sheet-type sensor 18, sandwiched between the trim cover and the padding 10 is thus also urged into the channel 12 (FIG. 1b). FIG. 1a shows a top view of the crossing location. A portion of the sheet type sensor 18 crosses the channel 12 along the line A-A. To avoid too sharp bending of the sheet-type sensor 18 already in unloaded conditions, ramps 20, 22 have been formed in the wings of the channel 12 so as to provide for gentle bending of the sensor 18 at the crossing. When the upholstered element is subject to pressure (illustrated at reference numeral 26, exerted e.g. by a seat occupant), it is deformed whereby the geometry of the surface of the foam element 10 may change. This may cause the sheet-type sensor 18 to buckle at the crimp channel 12 (as shown at reference numeral 28 in FIG. 1c). Such buckling may deteriorate, in particular, the electric circuits of the sheet-type sensor 18, which is obviously undesirable.

BRIEF SUMMARY OF THE INVENTION

An upholstered seat element for a vehicle seat comprises a foam padding having a surface generally shaped in conformity with an outward surface of the vehicle seat, a trim cover disposed on the foam padding surface, a sheet-type electric device (such as e.g. a flexible printed circuit, a film-type pressure sensor, a film-type capacitive sensor, a textile electric circuit or a textile sensor) arranged between the foam padding and the trim cover and an attachment assembly securing the trim cover to the foam padding. The foam padding has at least one channel ("crimp channel") formed therein on the foam padding surface, along which channel the attachment assembly is arranged. The sheet-type device has at least one strip-shaped portion crossing the channel in at least one crossing location. The foam padding has a recess formed therein at the at least one crossing location, the recess being dimensioned in such a way that the strip-shaped portion of the film type device may slide into the recess when the upholstered seat element is subjected to a force inducing deformation of the foam padding. It shall be noted that for the purposes of the present, "recess" designates a cavity extending from the surface of the foam element into the latter, e.g. a (blind or through) hole or an opening.

As will be appreciated, the recess provides a buffer zone that accommodates a part of the strip-shaped portion when the upholstered seat element is undergoes deformation. Accordingly, the behaviour of the sheet-like electric device may be better controlled. In particular, if the deformation of the foam padding under pressure is such that its surface is shortened along the length of the strip-shaped portion of the sheet-type device, the strip-shaped portion has an excess length with respect to the foam padding surface, which may "escape" into the recess. Of course, the deeper, wider, etc. the recess is, the greater is the excess length it can take in. Those skilled will note that the dimensions of the recess are preferably chosen in accordance with the minimum acceptable bending radius of the sheet-like electric device and the excess length that one has to expect in circumstances one expects to occur during the lifetime of the upholstered seat element. The excess length also depends on several parameters, such as the rigidity of the foam, the deformations that the foam padding undergoes when loaded, the elasticity of the sheet-like electric device etc.

The recess is arranged offset from the middle of the crossing location (where "middle" designates the middle of the channel in transversal direction), on the course of the strip-shaped portion of the sheet-like electric device. In the case of a symmetrical channel, this would be offset from the longitudinal plane of symmetry of the channel. (For the purposes of the present, "longitudinal" designates the direction of the crimp channel in the concerned location, whereas "transversal" designates a direction approximately perpendicular to the longitudinal direction and generally parallel to the surface of the foam element in such a location.) A further recess is formed in the foam at the at least one crossing location, the further recess being arranged substantially symmetrically to the first recess with respect to the middle of the crossing location, on the course of the strip-shaped portion. This is especially advantageous if the sheet-like electric device is fixed at the crimp channel.

Advantageously, the attachment assembly comprises a first (plastic or metal) rod arranged in the foam padding, a second (plastic or metal) rod fixed to the trim cover and fastening elements (e.g. hooks, clamps, straps, or the like) anchoring the second rod on the first rod, the first and second rods being arranged generally along the course of the channel.

Preferably, the sheet-type sensor comprises a reinforcement in the strip-shaped portion so as to increase the stiffness of the strip-shaped portion. The reinforcement could be provided in form of an additional plastic or metal film applied on the strip-shaped portion. The reinforcement should be configured such that the seating comfort is not noticeably affected and that the bending of the strip-shaped portion into the recess remains possible.

Additionally or alternatively, the foam element could comprise a reinforcement at the crossing location. This reinforcement could be provided as a less compressible foam material, textile sheets fixed to the foam surface in the channel or the like.

The second rod is preferably interrupted at said crossing location, so that it does not overlap with the strip-shaped portion of the sheet-type device. Such a configuration has the advantage that the risk of the second rod damaging the strip-shaped portion or any conductors thereon is reduced. Preferably, the second rod is a plastic tie-down; alternatively it could be a wire.

The first rod may bypass the crossing location; alternatively, the first rod may pass inside at least one of the recesses. In the latter configuration, the first rode preferably runs along an inner wall of the concerned recess or inside a foam protrusion (e.g. a bump) separating the recesses.

Preferably, the foam padding has one or more ramps formed therein, which ramps run obliquely (with constant or varying slope) from the foam padding surface into the channel and accommodate the strip-shaped portion. Such ramps are preferably covered by foam lobes provided in the foam padding.

As an alternative to the at least two recesses offset from the middle of the crossing location recesses, a single recess could be arranged substantially in the middle of the crossing location, at the bottom of the channel. In a symmetric channel, the middle of the crossing lies then in the channel's longitudinal plane of symmetry. If the recess is arranged in the middle of the crossing, the first rod may be formed at the crossing in such a way as to bypass the recess. Alternatively, the first rod may run straight through the recess or be formed so as to bypass the middle of the crossing location while running within the interior of the recess (e.g. by running along the inner walls of the recess). As concerns the second rod, it is preferably interrupted at the crossing location so that it does not overlap with the strip-shaped portion of the sheet-type device. In other words, the strip-shaped portion of the sheet-type device does not need to be routed under the second rod, which reduces the risk of damages. Those skilled will appreciate that any advantageous features presented herein with reference to the embodiment with two recesses (e.g. the oblique ramps, the foam lobes, the reinforcement of the strip-shaped portion or of the foam, etc.) can also be adapted to the embodiment with a single recess.

BRIEF DESCRIPTION OF THE DRAWINGS

Further details and advantages of the present invention will be apparent from the following detailed description of several not limiting embodiments with reference to the attached drawings, wherein.

DESCRIPTION OF PREFERRED EMBODIMENTS

FIGS. 2a-2d illustrate an upholstered seat element, in which the recess is arranged in the middle of the crossing location.

Figure 1C:
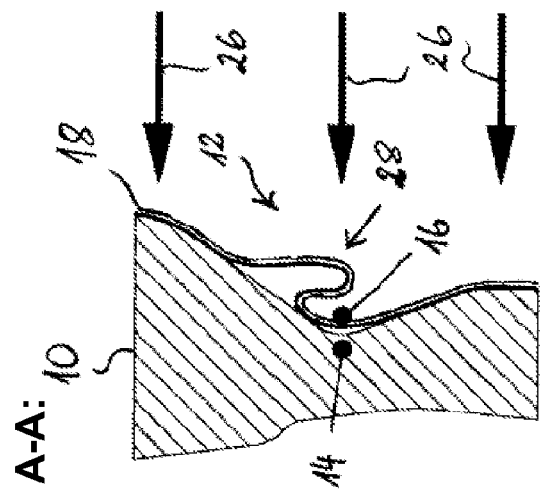
FIGS. 1a-1c are schematics illustrating a conventional crossing of a sheet-like electric device and a crimp channel.
Figure 1B:
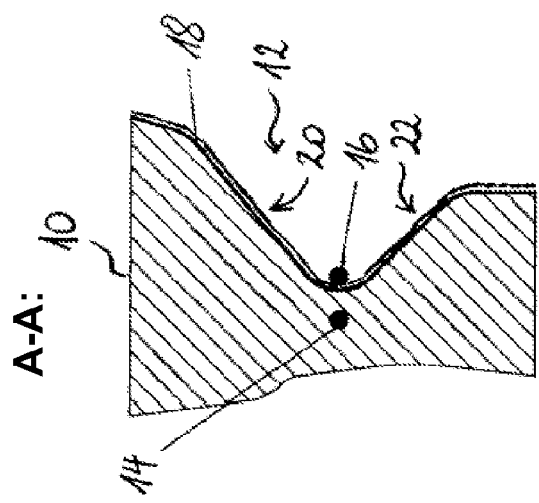
Figure 1A:
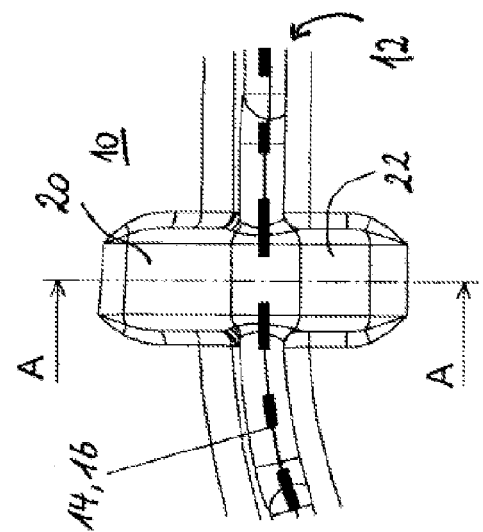
Figure 2D:
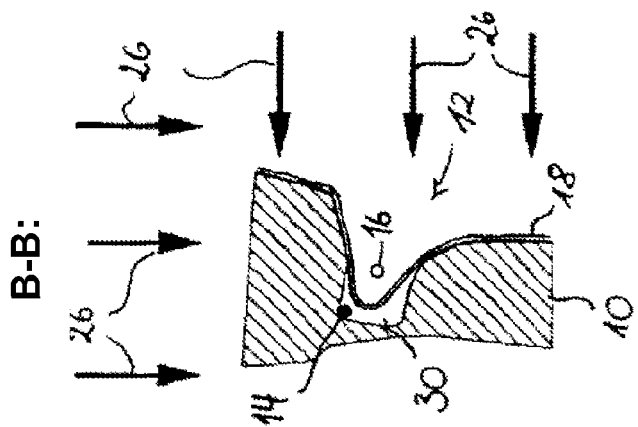
FIGS. 2a-2d are schematics illustrating a crossing of a sheet-like electric device and a crimp channel, where the recess is arranged in the middle of the crossing location.
Figure 2C:
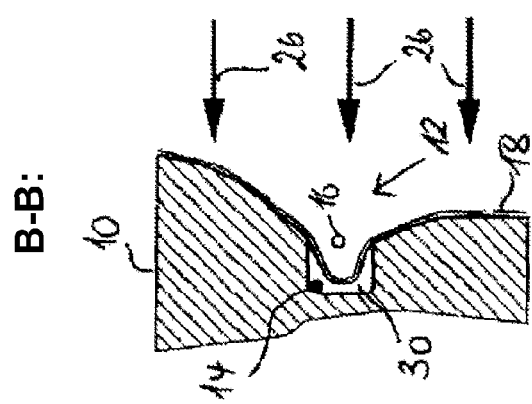
Figure 2B:
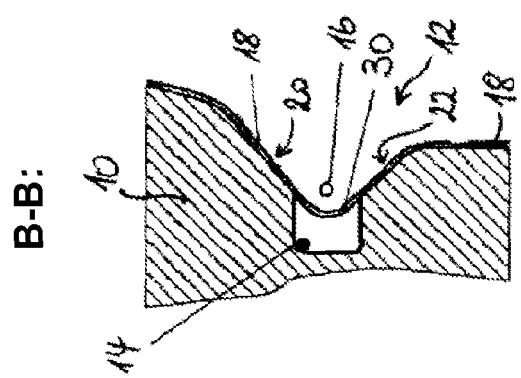
Figure 2A:
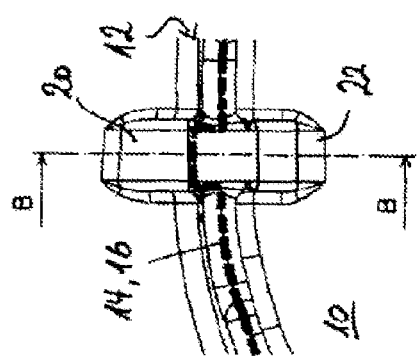
Figure 5:
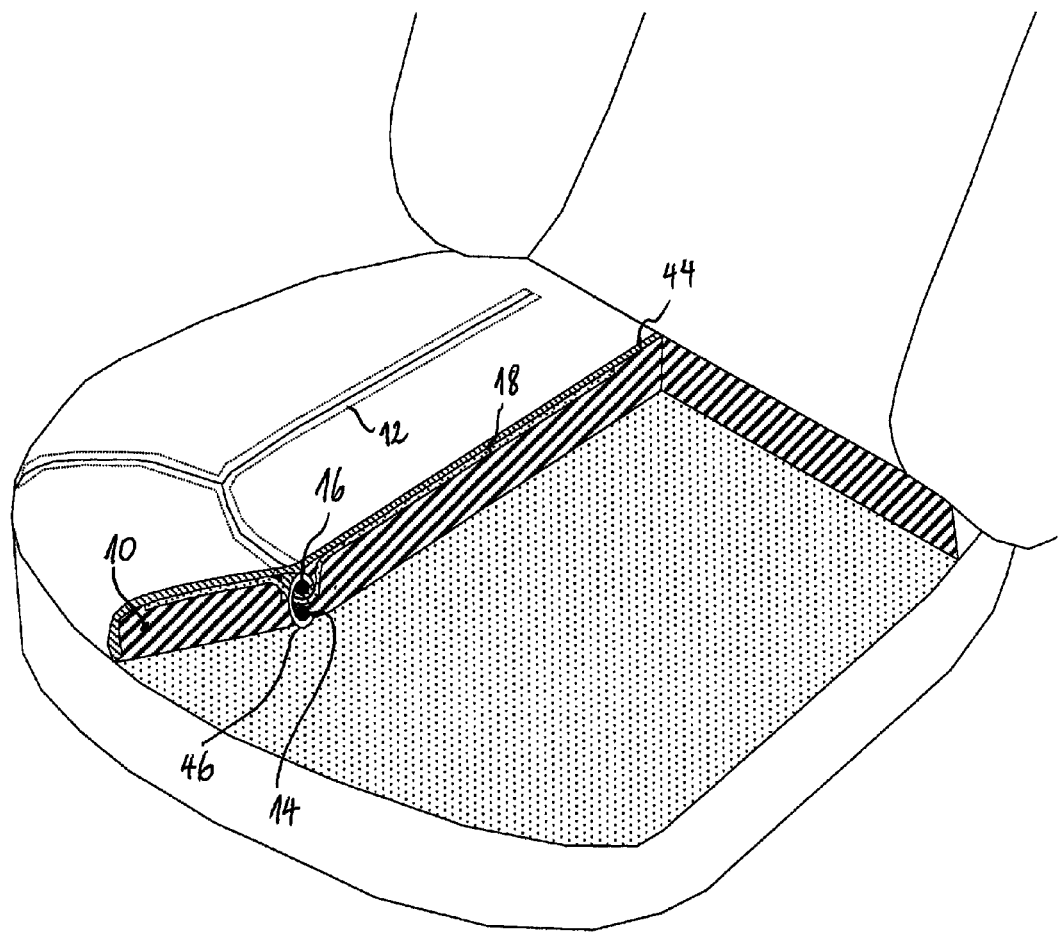
FIG. 5 is a front, perspective view and cross section of an upholstered seat element and an attachment assembly.

FIG. 2a shows a top view of the surface of a foam padding 10, in which has been formed (e.g. during or after the moulding process) a crimp channel 12. The crimp channel 12 defines an area where the trim cover 44 (shown in FIG. 5) is fixed to the foam padding 10. The attachment assembly 14, 16 used for fixing the trim cover to the foam padding 10 in this example comprises a first rod 14 (e.g. a wire) embedded within the foam padding 10 so as to run generally underneath (when seen from the surface of the foam padding 10) the crimp channel 12, a second rod 16 (which could be made of metal as the first rod, or made of plastic material) sewn into the trim cover 44 and running in the crimp channel, and clamps 46 (as seen in FIG. 5) anchoring the rod of the trim cover on the rod in the foam padding. The second rod may e.g. comprise an OKE tie-down. The attachment assembly thus urges the trim cover into the crimp channel 12. A flexible electric circuit (flexible, insulating polymer film on which are applied conductive patterns as well as a protective dielectric layer) is arranged between the foam padding 10 and the trim cover and comprises portions lying on either side of the crimp channel 12. The respective portions are interconnected by strip-shaped connections, which cross the crimp channel 12. Since the flexible electric circuit 18 is sandwiched between the trim cover and the foam padding 10, the attachment assembly 14, 16 also urges the strip-shaped connections into the crimp channel 12. It should be noted, however, that the second rod in the illustrated crossing does not extend into the crossing location, i.e. the second rod is interrupted. In FIGS. 2b-2d, reference numeral 16 indicates a front surface of the second rod; in the views shown, this front surface lies behind the plane B-B. Thus the strip-shaped portion of the flexible electric circuit 18 does not pass under the second rod 16, which has the benefit that the strip-shaped portion and the second rod do not interfere and that the strip-shaped portion is less exposed to potentially being damaged by the second rod. To avoid sharp bends of the flexible electric circuit 18 at the edges and the bottom of the crimp channel 12, which could occur if the strip-shaped portion were routed along the inner side walls of the crimp channel 12, the inner side walls of the crimp channel are interrupted at the crossing location and replaced by ramps 20, 22. Ramps 20, 22 can be formed in the foam padding 10 by insert moulding, cutting or any other suitable technique, and they provide for a smoother transition between the surface regions on both sides of the crimp channel 12.

At the crossing of the path arranged for the strip-shaped connection with the crimp channel 12, a recess 30 has been provided, into which the strip-shaped portion of the flexible electric circuit 18 may slip as the upholstered seat element is compressed (see FIGS. 2c and 2d). The anchoring rod 14 in the foam padding 10 has been bent so as to bypass the centre of the crossing and to run alongside the walls of the recess where it runs inside the recess, thereby avoiding that the anchoring rod 14 hinders the strip-shaped portion of the flexible electric circuit 18 to slip into the recess. When the upholstered seat element is subjected to forces inducing deformation (shown at reference numeral 26), the flexible electric circuit 18 may be caused to have an excess length in the transversal direction (line B-B in FIG. 2a) of the crimp channel 12, with respect to the foam padding surface. In this case, the strip-shaped connection portion of the flexible electric circuit 18 is drawn or pushed into the recess 30, which compensates for the temporary excess length. When the upholstered seat element is no longer compressed, the part of the strip-shaped portion that has escaped into the recess 30 is drawn out of the recess 30 and takes its original position.

Figure 3C:
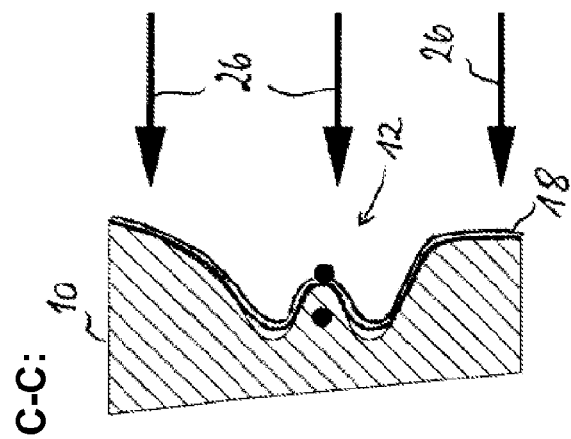
FIGS. 3a-3c are schematics illustrating a crossing of a sheet-like electric device and a crimp channel, where there are two recesses offset from the middle of the crossing location.
Figure 3B:
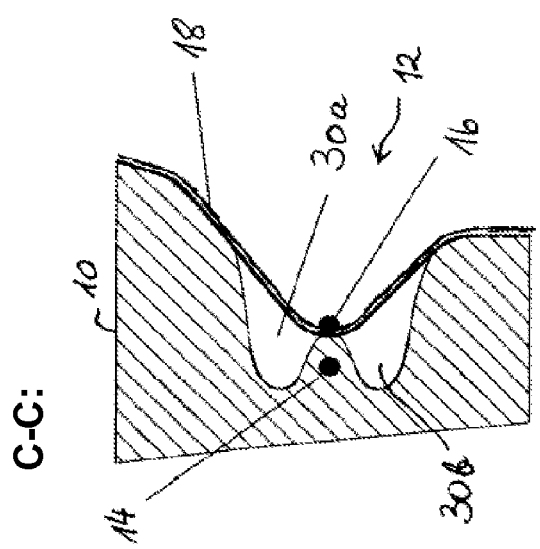
Figure 3A:
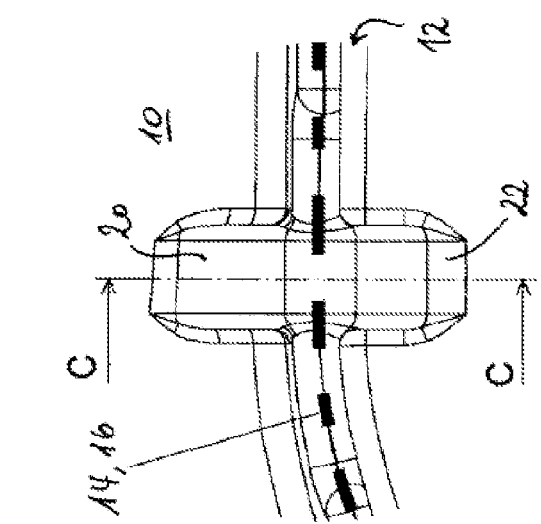

FIGS. 3a-3c illustrate an upholstered seat element, in which there are two recesses 30a and 30b arranged offset from the middle of the crossing location.

The top view in FIG. 3a shows a foam padding surface with a crimp channel 12 and ramps 20, 22 for a sheet-like electric device 18 in a similar configuration as in FIG. 2a. In this embodiment, however, instead of one centrally arranged recess, there are two recesses 30a and 30b, one on each side of the (virtual) longitudinal median plane of the crimp channel 12, as can be best seen in FIGS. 3b and 3c. In this example, the anchoring rod 14 in the foam padding 10 does not bypass the centre of the crossing location. Another difference with respect to FIGS. 2a-2d is that the second rod 16 also passes through the crossing locations. It should be noted, however, that these differences are optional: e.g. the second rod 16 could also be interrupted at the crossing location, in such a way that the strip-shaped portion of the flexible circuit does not need to pass under the second rod 16.

If the upholstered seat element is loaded (FIG. 3c), the flexible electric circuit 18, which is sandwiched between the trim cover and the foam padding 10, may slide into the recesses 30a, 30b on both sides of the crimp channel 12 so that the temporary excess length does not cause the flexible electric circuit 18 to buckle. It should be noted that one offset recess might be sufficient, provided, however, that the strip-shaped portion of the flexible electric circuit 18 is not tightly pinched by the attachment assembly 14, 16 (i.e. it may slip between the rods) or the first rod 14 and the trim cover (in case the second rod 16 is interrupted). If the flexible electric circuit 18 may not slip between the rods 14, 16 or between or the first rod 14 and the trim cover, then there should be at least one recess per side in order to avoid buckling on both sides of the crimp channel.

Figure 4:
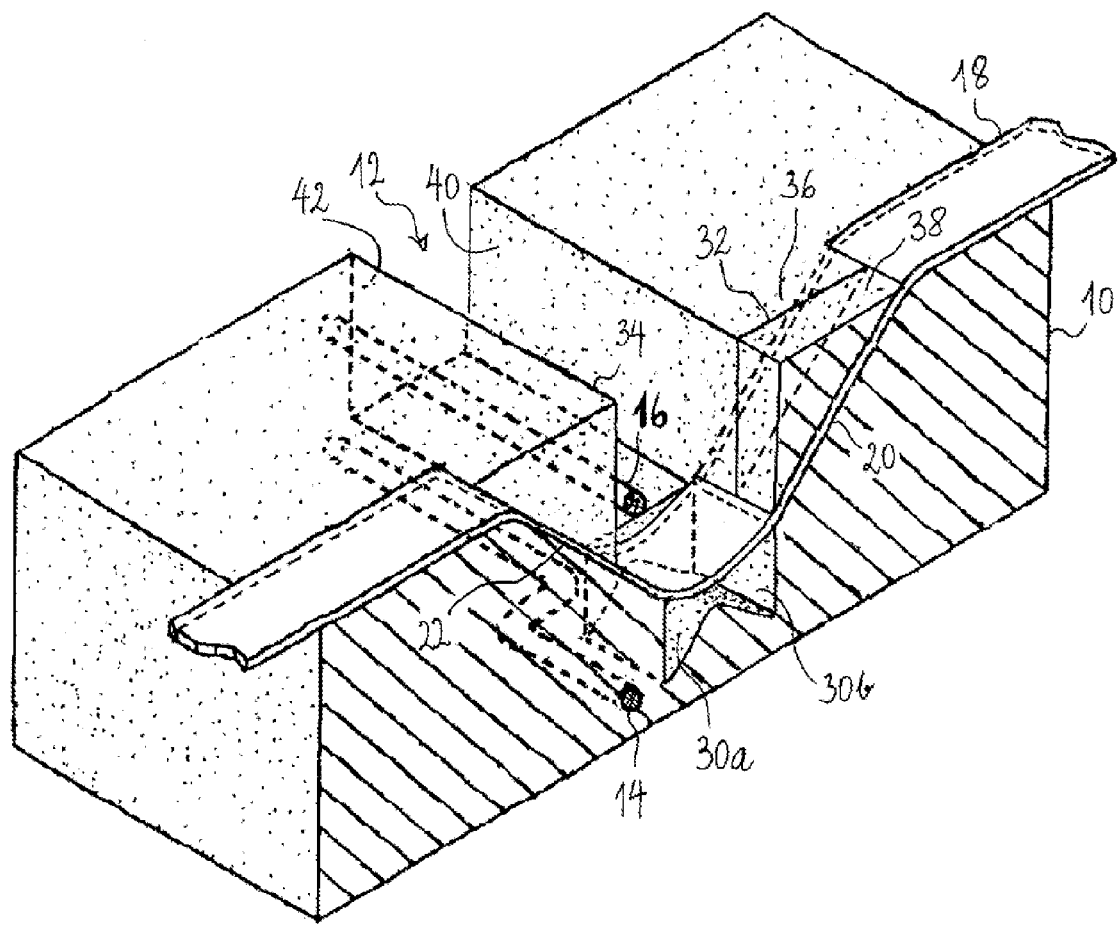
FIG. 4 is a schematic perspective view of a cut through a further variant of a crossing of a sheet-like electric device and a crimp channel having two recesses offset from the middle of the crossing location.

FIG. 4 shows a variant of the crossing of a sheet-like electric device and a crimp channel shown in FIGS. 3a-3c. Edges that are hidden from the chosen point of view are indicated by dashed lines. Unlike in the embodiment of FIGS. 3a-3c, the first rod 14 bypasses the crossing location. Alternatively, it could be routed along the inner walls of one of the recesses 30a, 30b or pass within the bump that separates the two recesses 30a, 30b. The second rod 16 does not extend into the crossing location so that there is not overlap with the strip-shaped portion of the flexible printed circuit 18. As can further be seen in FIG. 4, the ramps 20, 22 extend inside the foam padding. The ramps are provided by cuts 32 having the shape of an inverted letter "T", which can be formed by any suitable technique, e.g. by insert moulding or cutting. To put the strip-shaped portion of the flexible printed circuit 18 into place, the foam lobes 34, 36, 38 defined by the cuts 32 are temporarily urged to the side until the strip-shaped portion has been brought into position. Afterwards, the lobes 34, 36, 38 help to fix the flexible printed circuit 18. For the clarity of the drawing, the foam lobe closest to the viewer has been omitted in FIG. 4. The lobes have the advantage that the inner side walls 40, 42 of the crimp channel 12 are not noticeably discontinued at the crossing location, which may improve the outer appearance of the seat.

The invention claimed is:

1. An upholstered seat element for a vehicle seat, comprising:
    a foam padding having a foam padding surface generally shaped in conformity with an outward surface of said vehicle seat, said foam padding having a channel formed therein at said foam padding surface;
    a trim cover disposed on said foam padding surface;
    an attachment assembly, arranged along said channel, securing said trim cover to said foam padding;
    and a sheet-type electric device arranged between said foam padding and said trim cover, said sheet-type electric device having at least one strip-shaped portion crossing said channel in at least one crossing location;
    wherein said foam padding has a first recess formed therein at said at least one crossing location, said recess having dimensions adapted in such a way that said strip-shaped portion of the sheet-type electric device may slide into said first recess when said upholstered seat element is subjected to a force inducing deformation of said foam padding,
    wherein said first recess is arranged offset from a middle of said crossing location on a course of said strip-shaped portion and wherein said foam padding has a second recess formed therein at said at least one crossing location, said second recess being arranged substantially symmetrically to the first recess with respect to the middle of said crossing location, on the course of said strip-shaped portion.

2. The upholstered seat element as claimed in claim 1, wherein said sheet-type electric device includes at least one of a film-type pressure sensor and a film-type capacitive sensor.

3. The upholstered seat element as claimed in claim 1, wherein said sheet-type electric device includes a textile-based sensor.

4. The upholstered seat element as claimed in claim 1, wherein said attachment assembly comprises a first rod arranged in said foam padding, a second rod fixed to said trim cover and fastening elements anchoring said second rod on said first rod, said first and second rods being arranged generally along a course of said channel.

5. The upholstered seat element as claimed in claim 4, wherein said second rod is interrupted at said crossing location.

6. The upholstered seat element as claimed in claim 4, wherein said second rod is plastic.

7. The upholstered seat element as claimed in claim 4, wherein said second rod is a wire.

8. The upholstered seat element as claimed in claim 4, wherein said first rod passes inside at least one of said first recess and said second recess.

9. The upholstered seat element as claimed in claim 8, wherein said first rod runs along an inner wall of said at least one of said first recess and said second recess.

10. The upholstered seat element as claimed in claim 4, wherein said foam padding comprises a foam protrusion separating said first recess and said second recess from one another, and wherein said first rod passes inside said foam protrusion.

11. The upholstered seat element as claimed in claim 1, wherein said foam padding has one or more ramps formed therein, said ramps running obliquely from said foam padding surface into said channel and accommodating said strip-shaped portion.

12. The upholstered seat element as claimed in claim 11, wherein said foam padding comprises foam lobes covering said one or more ramps.

13. An upholstered seat element for a vehicle seat, comprising:
   a foam padding having a foam padding surface generally shaped in conformity with an outward surface of said vehicle seat, said foam padding having a channel formed therein at said foam padding surface;
   a trim cover disposed on said foam padding surface;
   an attachment assembly, arranged along said channel, securing said trim cover to said foam padding;
   and a sheet-type electric device arranged between said foam padding and said trim cover, said sheet-type device having at least one strip-shaped portion crossing said channel in at least one crossing location;
   wherein said foam padding has a first recess formed therein at said at least one crossing location, said recess having dimensions adapted in such a way that said strip-shaped portion of the film type device may slide into said first recess when said upholstered seat element is subjected to a force inducing deformation of said foam padding,
   wherein said first recess is arranged offset from a middle of said crossing location on a course of said strip-shaped portion and in that said foam padding has a second recess formed therein at said at least one crossing location, said second recess being arranged substantially symmetrically to the first recess with respect to the middle of said crossing location, on the course of said strip-shaped portion,
   wherein said attachment assembly comprises a wire arranged in said foam padding, a plastic tie-down fixed to said trim cover and fastening elements anchoring said plastic tie-down on said wire, said plastic tie-down and said wire being arranged along said channel.

14. The upholstered seat element as claimed in claim 13, wherein said sheet-type electric device includes at least one of a film-type pressure sensor and a film-type capacitive sensor.

* * * * *